(12) United States Patent
Paul Dominic et al.

(10) Patent No.: US 9,592,921 B2
(45) Date of Patent: Mar. 14, 2017

(54) GRAPHICAL REPRESENTATION OF IN-FLIGHT MESSAGES

(71) Applicant: Honeywell International Inc., Morristown, MN (US)

(72) Inventors: Maria John Paul Dominic, Bangalore (IN); Thomas D. Judd, Woodinville, WA (US); Rakesh Kumar, Karnataka (IN); Gurunadha Reddy Mallela, Karnataka (IN); John Azariah Rajadurai, Karnataka (IN); Saurabh Harshadbhai Gohil, Karnataka (IN); David Pepitone, Sun City West, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 142 days.

(21) Appl. No.: 13/794,089

(22) Filed: Mar. 11, 2013

(65) Prior Publication Data
US 2014/0253585 A1 Sep. 11, 2014

(51) Int. Cl.
*G08B 21/00* (2006.01)
*B64F 1/18* (2006.01)
(Continued)

(52) U.S. Cl.
CPC ............ *B64D 45/00* (2013.01); *G01C 23/00* (2013.01); *G08G 5/0013* (2013.01); *G08G 5/0021* (2013.01)

(58) Field of Classification Search
CPC ...... G01C 23/00; G01C 23/005; G01C 5/005; G01C 21/005; G01S 13/9303; G01S 1/02;
(Continued)

(56) References Cited

U.S. PATENT DOCUMENTS 5,057,835 A * 10/1991 Factor et al. ............ 340/995.27
5,208,590 A * 5/1993 Pitts ............................. 340/973
(Continued)

FOREIGN PATENT DOCUMENTS

EP 2244215 10/2010
EP 2506237 10/2012
(Continued)

OTHER PUBLICATIONS

The European Patent Office, "European Search Report", "from EP Counterpart of U.S. Appl. No. 13/794,089", Jul. 11, 2014, Published in: EP.
(Continued)

*Primary Examiner* — Emily C Terrell
(74) *Attorney, Agent, or Firm* — Fogg & Powers LLC

(57) ABSTRACT

A graphical in-flight message representation system comprises a sensor configured to measure a characteristic of a flight of an aircraft and a communication device configured to send and receive in-flight messages. An in-flight message is a message communicated during the flight of the aircraft. The system also comprises a display unit configured to display a graphical flight progress indicator and one or more message icons, each of the one or more message icons corresponding to a respective in-flight message. The graphical flight progress indicator is representative of the characteristic of the flight measured by the sensor. Each of the one or more message icons are displayed in location relative to the graphical flight progress indicator based on the measured characteristic of the flight when the respective in-flight message was communicated.

19 Claims, 7 Drawing Sheets

(51) Int. Cl.
*G08G 5/00* (2006.01)
*G08B 23/00* (2006.01)
*G01C 21/00* (2006.01)
*B64D 45/00* (2006.01)
*G01C 23/00* (2006.01)

(58) Field of Classification Search
CPC ............ G01S 2205/003; G01S 5/0027; H04B 7/18506
See application file for complete search history.

(56) References Cited

U.S. PATENT DOCUMENTS

| | | | |
|---|---|---|---|
| 6,154,637 A * | 11/2000 | Wright | G05D 1/0055 340/539.1 |
| 6,160,497 A * | 12/2000 | Clark | 340/961 |
| 6,501,392 B2 * | 12/2002 | Gremmert | G01S 7/003 340/945 |
| 6,661,353 B1 * | 12/2003 | Gopen | 340/973 |
| 6,700,482 B2 * | 3/2004 | Ververs et al. | 340/500 |
| 6,832,138 B1 * | 12/2004 | Straub et al. | 701/3 |
| 7,177,731 B2 | 2/2007 | Sandell et al. | |
| 7,272,471 B1 | 9/2007 | Palich et al. | |
| 7,312,725 B2 * | 12/2007 | Berson et al. | 340/980 |
| 7,363,119 B2 | 4/2008 | Griffin, III et al. | |
| 7,787,999 B1 | 8/2010 | Barber | |
| 7,876,238 B2 * | 1/2011 | Vandenbergh et al. | 340/971 |
| 8,164,487 B1 | 4/2012 | Tsai | |
| 8,195,347 B2 | 6/2012 | Boorman | |
| 8,285,427 B2 | 10/2012 | Rogers et al. | |
| 8,417,396 B2 | 4/2013 | Goodman et al. | |
| 8,686,878 B2 | 4/2014 | Whitlow et al. | |
| 8,760,319 B2 * | 6/2014 | Kommuri | G08G 5/0013 340/945 |
| 9,019,128 B1 * | 4/2015 | Kim | G01C 23/00 340/945 |
| 9,132,913 B1 | 9/2015 | Shapiro et al. | |
| 2003/0004619 A1 * | 1/2003 | Carriker et al. | 701/3 |
| 2003/0193408 A1 | 10/2003 | Brown et al. | |
| 2003/0193411 A1 * | 10/2003 | Price | 340/973 |
| 2004/0059472 A1 * | 3/2004 | Hedrick | 701/3 |
| 2004/0254691 A1 | 12/2004 | Subelet | |
| 2005/0049762 A1 * | 3/2005 | Dwyer | G08G 5/0021 701/3 |
| 2005/0203676 A1 | 9/2005 | Sandell et al. | |
| 2007/0200731 A1 * | 8/2007 | Winkler | G01C 23/005 340/961 |
| 2007/0219679 A1 | 9/2007 | Coulmeau | |
| 2008/0027629 A1 | 1/2008 | Peyrucain et al. | |
| 2010/0153875 A1 | 6/2010 | O'Flynn et al. | |
| 2011/0166772 A1 | 7/2011 | Ferro et al. | |
| 2012/0215388 A1 | 8/2012 | Pepitone et al. | |
| 2013/0249712 A1 | 9/2013 | Buratto et al. | |
| 2014/0309821 A1 | 10/2014 | Poux et al. | |
| 2014/0320417 A1 | 10/2014 | Pakki et al. | |
| 2015/0002316 A1 | 1/2015 | Sridhar et al. | |
| 2016/0019794 A1 | 1/2016 | Dominic et al. | |
| 2016/0047674 A1 | 2/2016 | Ramaiah et al. | |
| 2016/0161283 A1 | 6/2016 | Shamasundar et al. | |

FOREIGN PATENT DOCUMENTS

| | | | |
|---|---|---|---|
| SG | WO 2011128835 A2 * | 10/2011 | ........... G08G 5/0013 |
| WO | 2009046462 | 4/2009 | |
| WO | 2011128835 | 10/2011 | |

OTHER PUBLICATIONS

Baxley et al, "Use of Data Comm by Flight Crew in High-Density Terminal Areas", "American Institute of Aeronautics and Astronautics", Sep. 2010, pp. 1-14.

Shamasundar et al., "Systems and Methods for Displaying Position Sensitive Datalink Messages on Avionics Displays", "U.S. Appl. No. 14/559,755, filed Dec. 3, 2014", Dec. 3, 2014, pp. 1-30.

Adams et al, "Incorporating Data Link Messaging Into a Multi-Function Display for General Aviation Aircraft", "25th International Congress of the Aeronautical Sciences", 2006, pp. 1-9.

Mueller, "Experimental Evaluation of an Integrated Datalink and Automation-Based Strategic Trajectory Concept", "7th AIAA Aviation Technology, Integrated and Operations Conference", Sep. 18-20, 2007, pp. 1-15, Publisher: American Institute of Aeronautics and Astronautics.

U.S. Patent and Trademark Office, "Office Action", "U.S. Appl. No. 14/559,755", Apr. 19, 2016, pp. 1-41.

U.S. Patent and Trademark Office, "Final Office Action", "U.S. Appl. No. 14/559,755", Sep. 21, 2016.

\* cited by examiner

GRAPHICAL REPRESENTATION OF IN-FLIGHT MESSAGES

BACKGROUND

CPDLC messages are used for communication between controller and pilot. Traditionally, all received and sent messages are displayed in a list box format. The pilot normally opens up the list box and opens an individual message to read. The pilot must navigate between review and new menus to read the messages. There are several different message types, such as reports, conditional clearances, and loadable messages. In the case of reports, a report is formed and sent when a particular scenario or set of conditions is met.

SUMMARY

In one embodiment, a graphical in-flight message representation system is provided. The system comprises a sensor configured to measure a characteristic of a flight of an aircraft and a communication device configured to send and receive in-flight messages. An in-flight message is a message communicated during the flight of the aircraft. The system also comprises a display unit configured to display a graphical flight progress indicator and one or more message icons, each of the one or more message icons corresponding to a respective in-flight message. The graphical flight progress indicator is representative of the characteristic of the flight measured by the sensor. Each of the one or more message icons are displayed in location relative to the graphical flight progress indicator based on the measured characteristic of the flight when the respective in-flight message was communicated.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
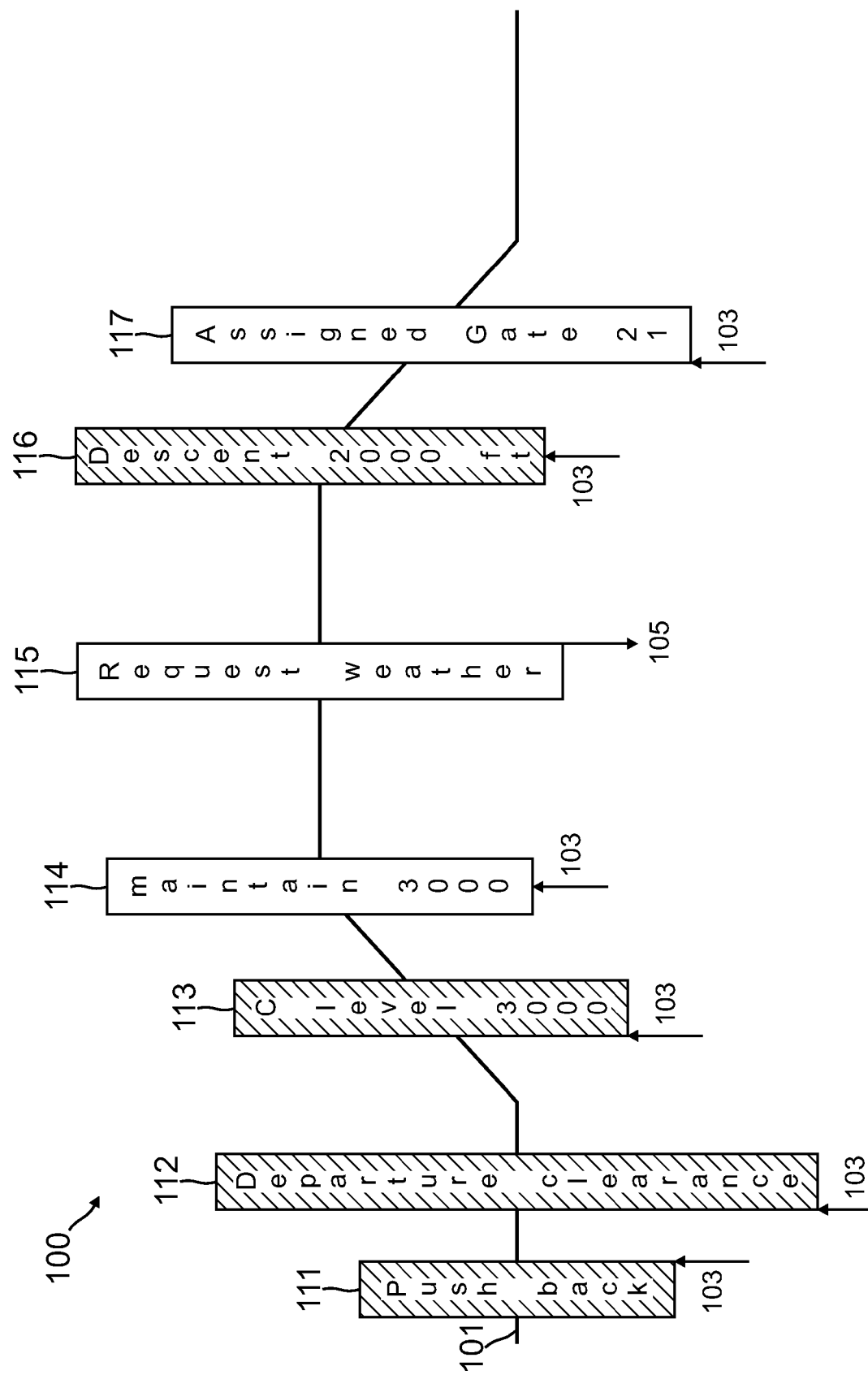
FIG. 1 is an illustration of one embodiment of a graphical representation of in-flight messages.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is an illustration of one embodiment of a graphical representation 100 of in-flight messages. The graphical representation 100 includes a graphically depicted flight progress indicator 101. In the embodiment shown in FIG. 1, this is a flight path altitude over time representation. In another embodiment, the flight progress indicator 101 represents the flight path as geographical position. In other embodiments, the flight progress indicator 101 is a timeline of the flight progress. Along the depicted flight progress indicator 101 are a plurality of message icons representing individual messages. As used herein, the term "flight" refers to the time starting from when the aircraft begins moving to when the aircraft comes to a stop. Thus, a flight includes in air movement and ground movement, such as taxiing, take-off, and landing. Thus, an in-flight message is a message received during a flight of the aircraft.

Each message icon is depicted on the flight progress indicator 101 to indicate when and/or where the message was received or sent in relation to the flight progress. The first message icon 111 is represented graphically as a message box which appears early on the flight progress indicator 101, which in this example indicates that the message occurred while the aircraft was on the ground. Each message icon is accompanies by either an uplink indication 103 or a downlink indication 105. The uplink indication 103 indicates an uplink communication from the controller to the plane. In this example, the uplink indication 103 is displayed as an upward pointing arrow. However, the uplink indication 103 can be implemented differently in other embodiments. For example, in some embodiments, the uplink indication 103 is a word, such as "up" which accompanies each corresponding uplink message icon. The downlink indication 105 indicates a downlink communication from the plane to the controller. In this example, the downlink indication is implemented as a downward pointing arrow. However, it is to be understood that the downlink indication can be implemented differently in other embodiments. For example, in some embodiments, the downlink indication 105 is a word, such as "down" which accompanies each corresponding downlink message icon, or the message is color coded, shaded, or can have a different border outline.

In this example, the uplink message icons on the flight progress indication 101 also include a departure clearance message icon 112; a message icon 113 indicating C level 3000; a message icon 114 indicating maintain 3000; a message icon 116 indicating descent 2000 ft.; and a message icon 117 indicating a gate assignment. The message icon 114 is color coded to indicate a different status or priority of a message. In another embodiment, this can be accomplished through the use of different fonts, font sizing, or other similar techniques. The gate assignment message icon 117 is also color coded to indicate a different status and/or priority.

The message icon 115 indicates a weather request message and is accompanied by a downlink indication 105. The request weather message icon 115 is color coded to indicate a different status or priority from the other messages, similar to message icons 114 and 117. The message icons are displayed along the flight progress indicator 101 according to when the message was sent or received, and also color coded to indicate status and/or priority on one display screen. The pilot can select an individual message to open and read from this screen.

Figure 2:
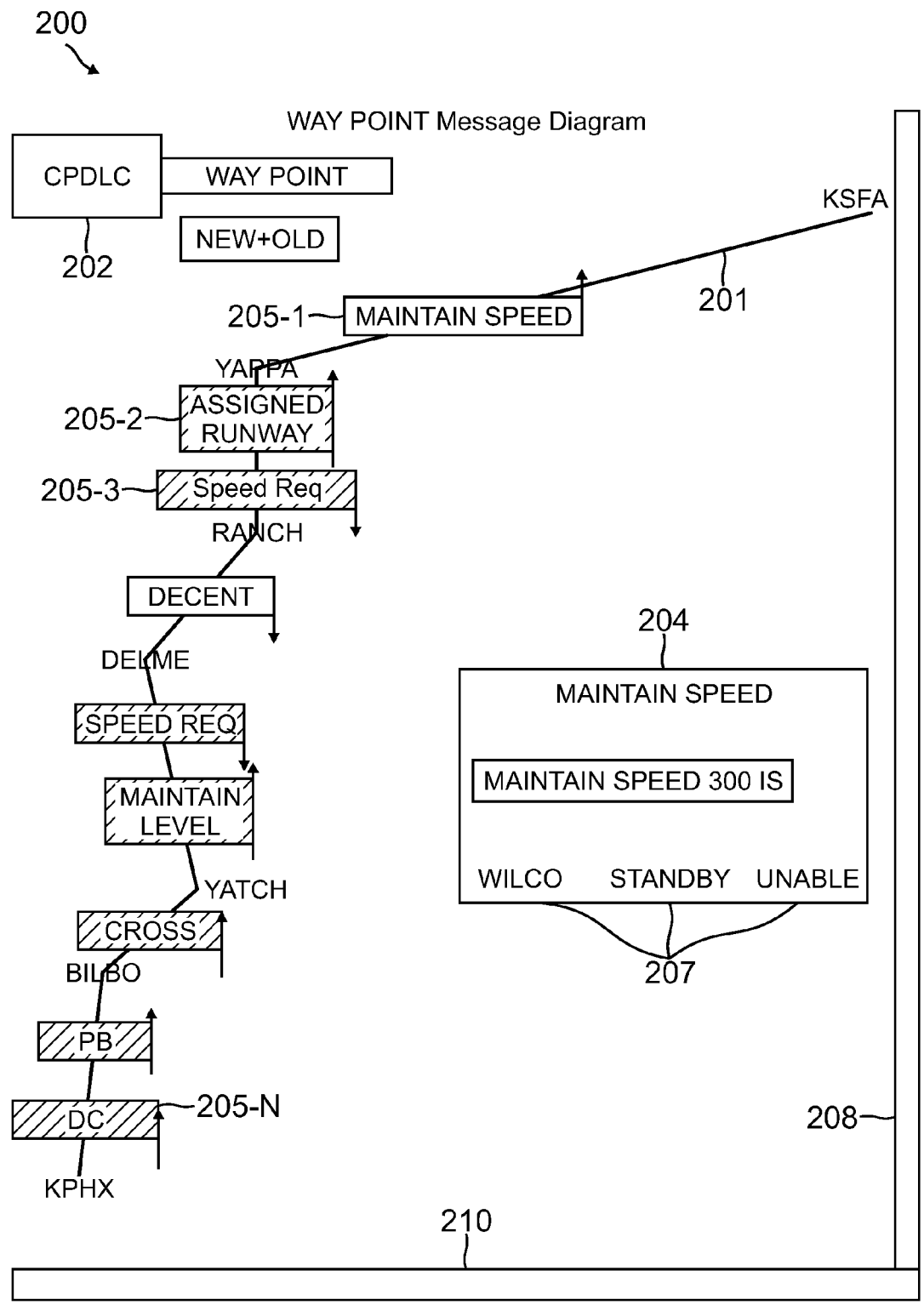
FIG. 2 is an illustration of another embodiment of a graphical message display.

FIG. 2 shows another embodiment of a message display 200. Selectable message filter 202 provides the pilot with options to filter the message display. In this example, the selectable message filter 202 provides three options from which to choose messages: CPDLC, Waypoint and New+ Old. In FIG. 2, waypoint messages are displayed. The flight progress indicator 201 in this example depicts the flight path as geographic positions. A plurality of messages 205-1 . . . 205-N are displayed along the flight path according to when and where the messages were sent or received. The messages 205 are color coded to represent different statuses and priorities of the messages as discussed above. The messages 205-1 . . . 205-N are also accompanied by uplink and downlink indications, which are displayed as up and down arrows.

In this example, selecting a message, such as by hovering over, clicking on or otherwise pointing to the message box, will cause related messages to be highlighted with a colored border. For example, selecting message 205-1 highlights related message 205-3 with a red-colored border. In one embodiment, this indicates that the messages have related Message Identification Numbers (MIN) and Message Reference Numbers (MRN). In other embodiments, the related messages can be identified by using different color coding, font display settings, displaying the MIN and MRN numbers themselves, arrows or lines between messages, or through other changes known to those having ordinary skill in the art.

Selecting a message also displays the message on the screen and creates a response dialog 204. For example, in the example of FIG. 2, the message 205-1 was selected. In some embodiments, the same action to select a message which causes related messages to be highlighted also causes the message to be displayed. For example, hovering over or clicking on a message both highlights related messages and displays the selected message. In other embodiments, different actions are required to display the message and to highlight related messages. For example, in one embodiment, clicking on a message block once causes related messages to be highlighted and clicking on the message block twice causes the message to be displayed and creates a response dialog. In one embodiment, the message blocks can be hidden from the map display by the user. This in some embodiments, the message blocks can be hidden from the map by clicking a checkbox or button within the message block. The hidden message is still available in the message log, but hidden from full view on the map.

The response dialog 204 displays the contents of the selected message, along with response options 207. The response options in this example are "Wilco," "Standby," and "Unable." In other messages, other response options may be presented depending on the message requirements, and the system requirements of other embodiments. Other response options include "Accept" and "Reject;" "Affirmative" and "Negative;" "Roger." For these response options, a "Standby" response option will almost always accompany the other response options. For some messages, response options might include the option of responding with a report, and in some cases, not having a response option at all the message only needing to be viewed. If the message or messages do not fit on the display screen, zooming functionality may be implemented in the message display system 200. This will cause horizontal scrollbar 210 and vertical scrollbar 208 to appear on the display to navigate the message display 200. In other embodiments, the message may be opened, taking the user to the actual message page and displaying the message itself. In one embodiment, once the message has been responded to, a "Clear" button is provided in the response dialog. The "Clear" button allows the pilot to clear the message dialog.

Figure 3A:
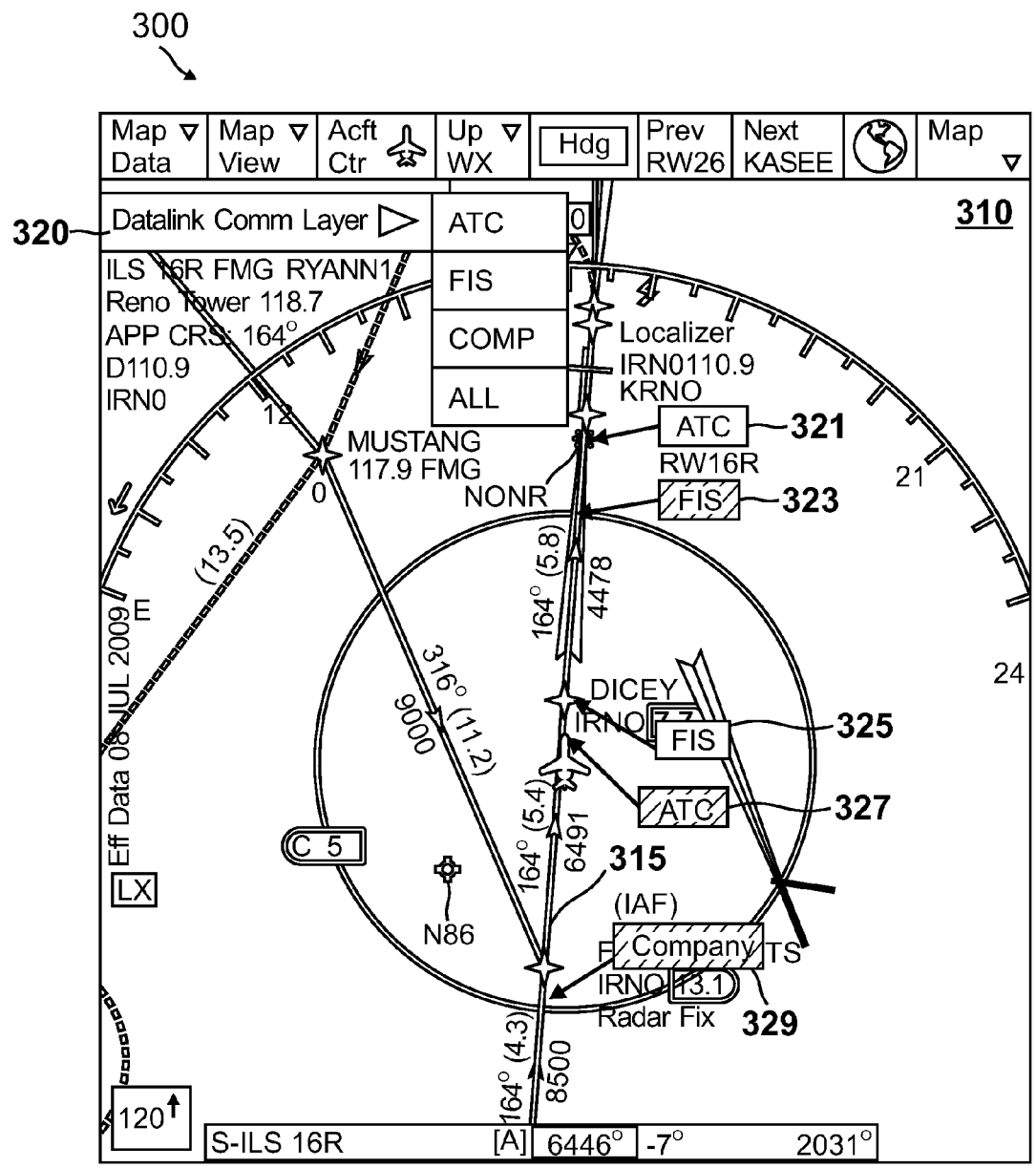
FIGS. 3A-3C illustrate one embodiment of a graphical message display overlay.

FIG. 3A illustrates an exemplary graphical in-flight message overlay 300. A map graphical user interface (GUI) 310 is displayed on screen to the pilot. In some embodiments, the map GUI 310 can be displayed directly on the route page of a flight management system (FMS) or flight management computer (FMC). In other embodiments, the map GUI 310 may be displayed on the multifunction display (MFD) or navigation display. In yet another embodiment, the map GUI 310 may be displayed on a Communication Management Function (CMF) display. The type of display used to display the map is not limited to these examples, and other displays capable of displaying such information may be used.

A flight path 315 overlay is displayed as a layer of the map GUI 310. A selectable message filter 320 provides the user control over what kind of datalink communication, or what type of messages the user wishes to view on the overlay. In one embodiment, the options provided for the selectable message filter 320 are Air Traffic Control (ATC), Flight Information Service (FIS), Company or Airline Operation Communications (AOC), or ALL. Graphical representations of in-flight messages can be added as a map layer and are positioned on the flight path according to time received along the intended or actual flight path. The messages themselves are depicted on the flight path as selectable message icons 321, 323, 325, 327, and 329. Arrows originating from the message icon point to a location on the flight path 315 where the aircraft was located when the message was sent or received. A company message is shown from earlier in the flight path at message icon 329. In some embodiments, when a new message is received, the newly received message or messages can be auto-selected or auto-displayed, such as when another message isn't already being viewed. In some embodiments, a message icon is color coded to indicate that it has not been responded to. This is depicted in FIG. 3A, for example, with shading of message icon 329. In other embodiments, other indicators may be used to show that the message has been responded to, or what response was sent such as a WILCO or UNABLE. Examples of such indicators can include, but are not limited to, changing font sizes, message borders, or colors. Message icon 327 shows label ATC to indicate a message from air traffic control. Message icon 327 is also shaded to indicate that the message has not been responded to. Message icon 325 is labeled FIS to indicate a flight information service message. Message icon is not shaded, to indicate that a response to the message was sent. Message icon 323 shows an FIS message that was not responded to. Message icon 321 shows an ATC message that was responded to. Individual messages can be opened from this screen so as to read the entire contents of a message on another page, or alternatively, messages can be responded to from this overlay interface 300 as described below with reference to FIGS. 3B and 3C.

Figure 3B:
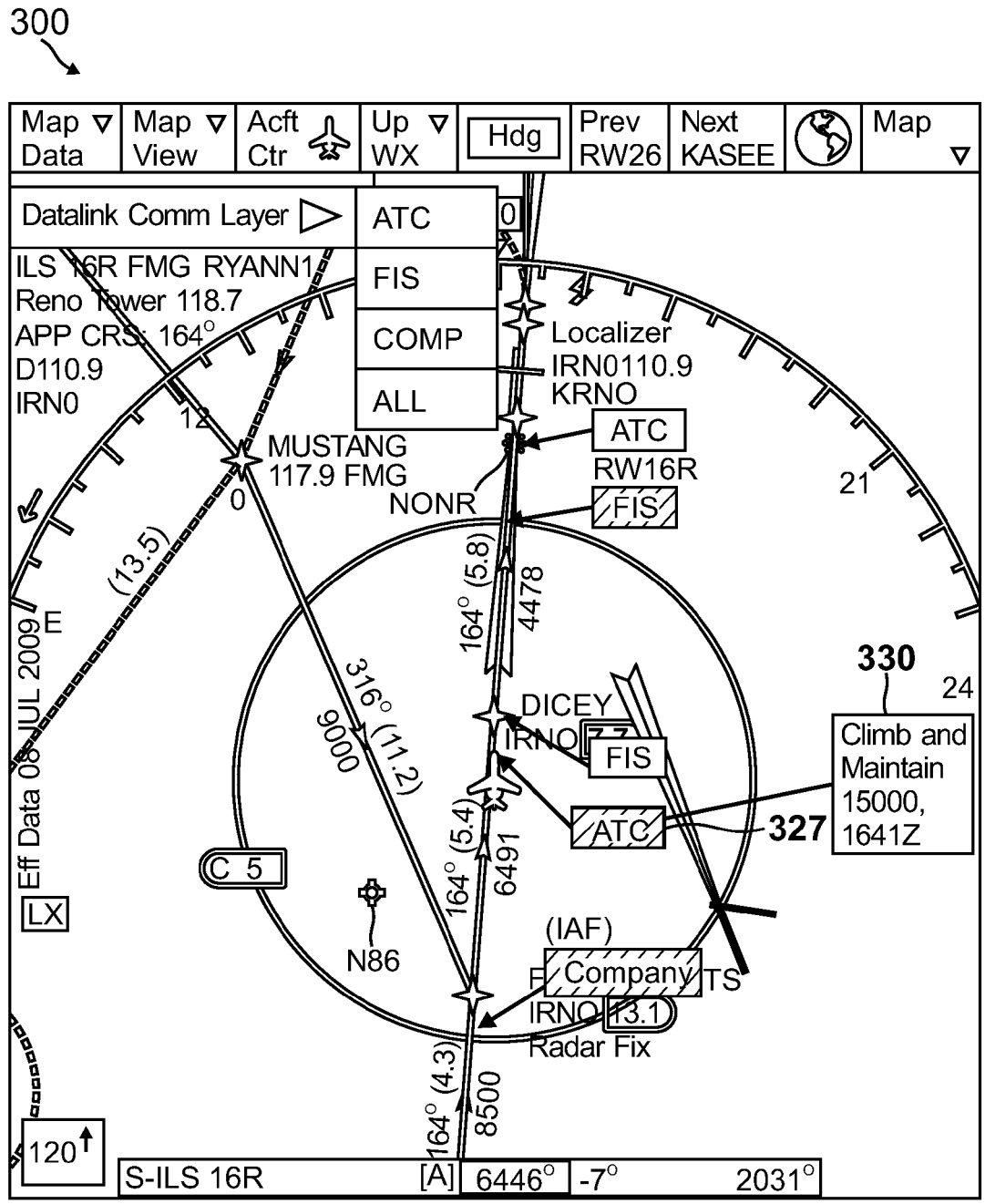

FIG. 3B illustrates exemplary graphical in-flight message overlay 300 when a user controlled cursor or pointer is positioned over, or otherwise selects, a message icon. In this example, message icon 327 is selected. By positioning a cursor or pointer over the message icon 327, a summary communication message 330 "pops up" or appears on the display. The summary communication message 330 contains a summary of the contents of the message.

Figure 3C:
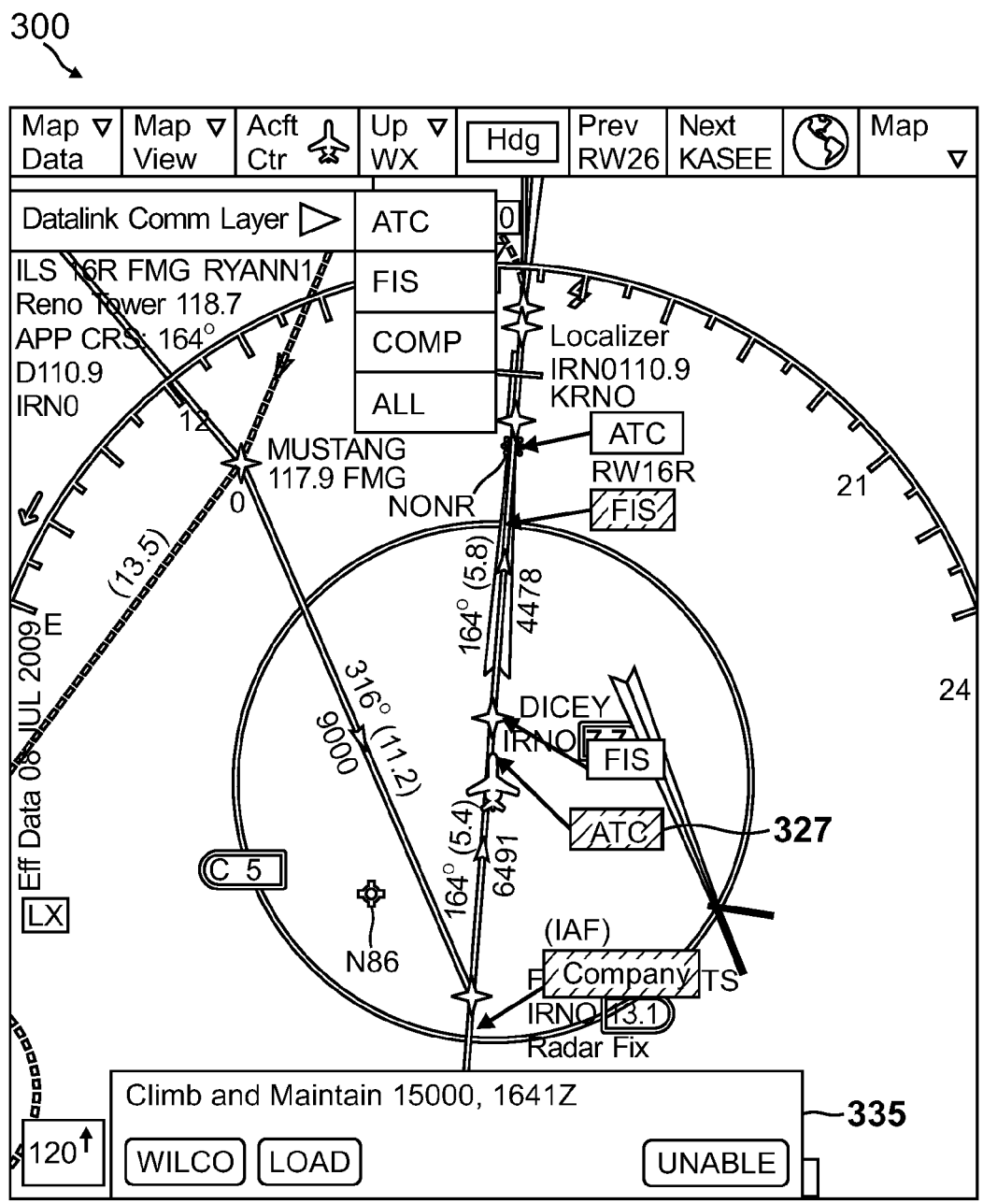

FIG. 3C illustrates exemplary graphical in-flight message overlay 300 when the message icon 327 is opened for response. As discussed above, one action can be used to select a message for review or summary as described with respect to FIG. 3B and another action can be used to select a message for response as shown in FIG. 3C. For example, in one embodiment a single click causes the summary communication message 330 of FIG. 3B to be displayed whereas clicking on the message box twice causes a response dialog 335 to be opened on the screen. The response box 335 contains options for the pilot to respond to the message. In one embodiment the response options are WILCO, for "will comply," or UNABLE, Load for loading the clearance into the FMC, or to send the ATC report. Once a response is sent, the response dialog 335 blanks or closes and the uplink message will indicate that it was closed and corresponding downlink message will be indicated as discussed previously. The specific response options can vary based on the type of message.

Figure 4:
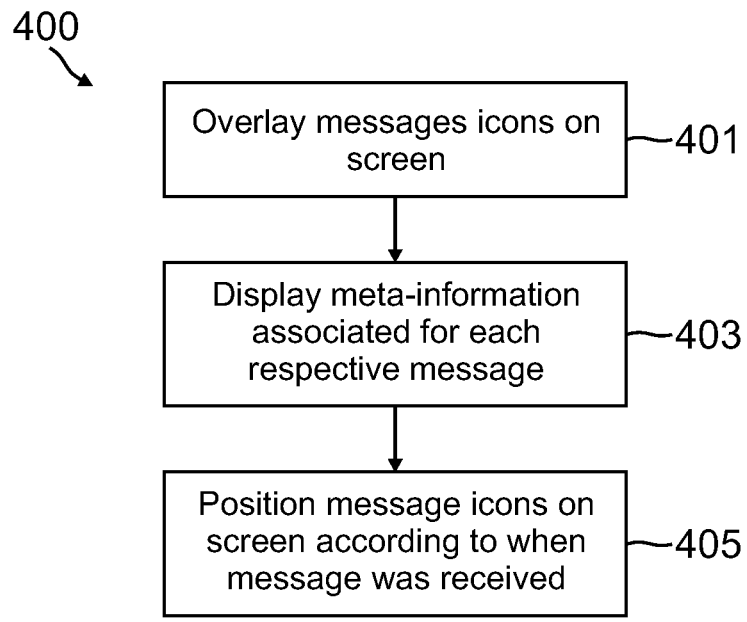
FIG. 4 is a flow chart depicting one embodiment of a method of graphical representation of in-flight messages.

FIG. 4 illustrates a flow chart depicting an exemplary method 400 of displaying a graphical representation of in-flight messages. At block 401, message icons are overlaid on the screen. In some embodiments, the message icons may be overlaid on a map GUI, as discussed above with respect to FIGS. 3A-3C. At block 403, meta-information associated with each respective message is displayed. Meta-information may include indications of whether a message has been responded to, the message origin such as ATC, AOC, or FIS, the type of message, message priority, message meaning, dialog type (speed, altitude, route, etc.), message status (open, closed, etc.), response type (Wilco/Unable; Affirmative/Negative; Roger, etc.), message relationships (for example, related MRN/MIN) or any other relevant information other than the message content itself. Ways to relay meta-information on the display include, but are not limited to, color coding of message icons, adjusting font, adjusting font size, adjusting border size, color or shape, or a combination of these kinds of indicators. At block 405, the message icons are positioned on the screen according to when the message was communicated. As used herein, the term "communicated" includes sending and receiving. Thus, the message icons are positioned on the screen according to when the corresponding in-flight message was sent from the aircraft or received at the aircraft. For example, the message icons are positioned according to the altitude of the aircraft when and/or where the message was communicated, the geographic location of the aircraft when the message was communicated, and/or the time when the message communicated. The time can be an absolute time or a time relative to when the flight began. In other embodiments, other characteristics of the flight are used to determine the position of the message icons. In one embodiment, the position is indicated by arrows originating at the message icons and pointing to a location on the flight path indicating when during the flight the message was received. In other embodiments, other indications of position may be used instead of arrows, such as solid lines, dashes, or other such alternatives.

Figure 5:
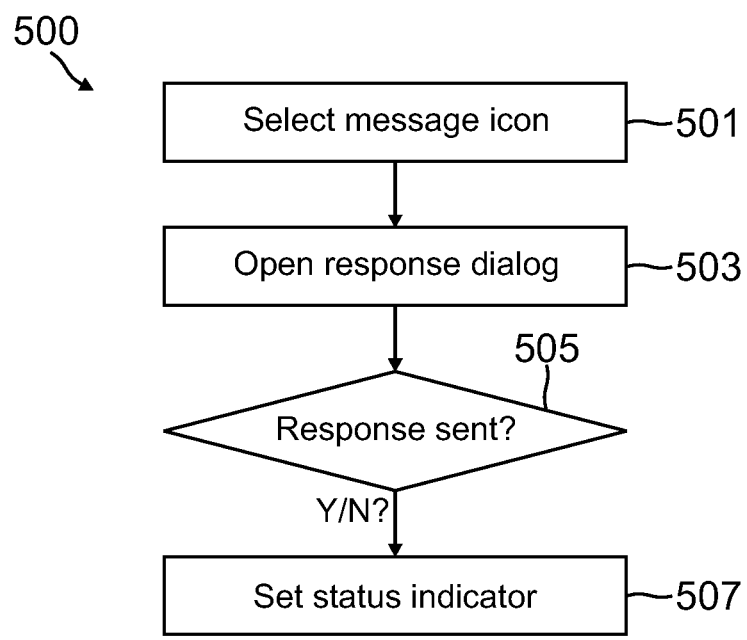
FIG. 5 is a flow chart depicting one embodiment of a method of operation of a graphical overlay of in-flight messages.

FIG. 5 illustrates an exemplary method 500 for operation of a graphical overlay of in-flight messages. At block 501, a message icon is selected. At block 503, this prompts the system to open a response dialog. The response dialog contains options for responding to the message. In one embodiment, the options for responding to the message include WILCO, UNABLE, STANDBY and LOAD. In one embodiment, the response dialog is overlaid on the same map GUI as the flight progress indicator which displays the message icons. In another embodiment, the message is opened, taking the user to a full message page from where the user has access to the entire message and can respond to the message. At decision block 505, after the response dialog is opened, the system determines whether a response was sent. At block 507, a status indicator is set to indicate whether a response was sent or not.

Figure 6:
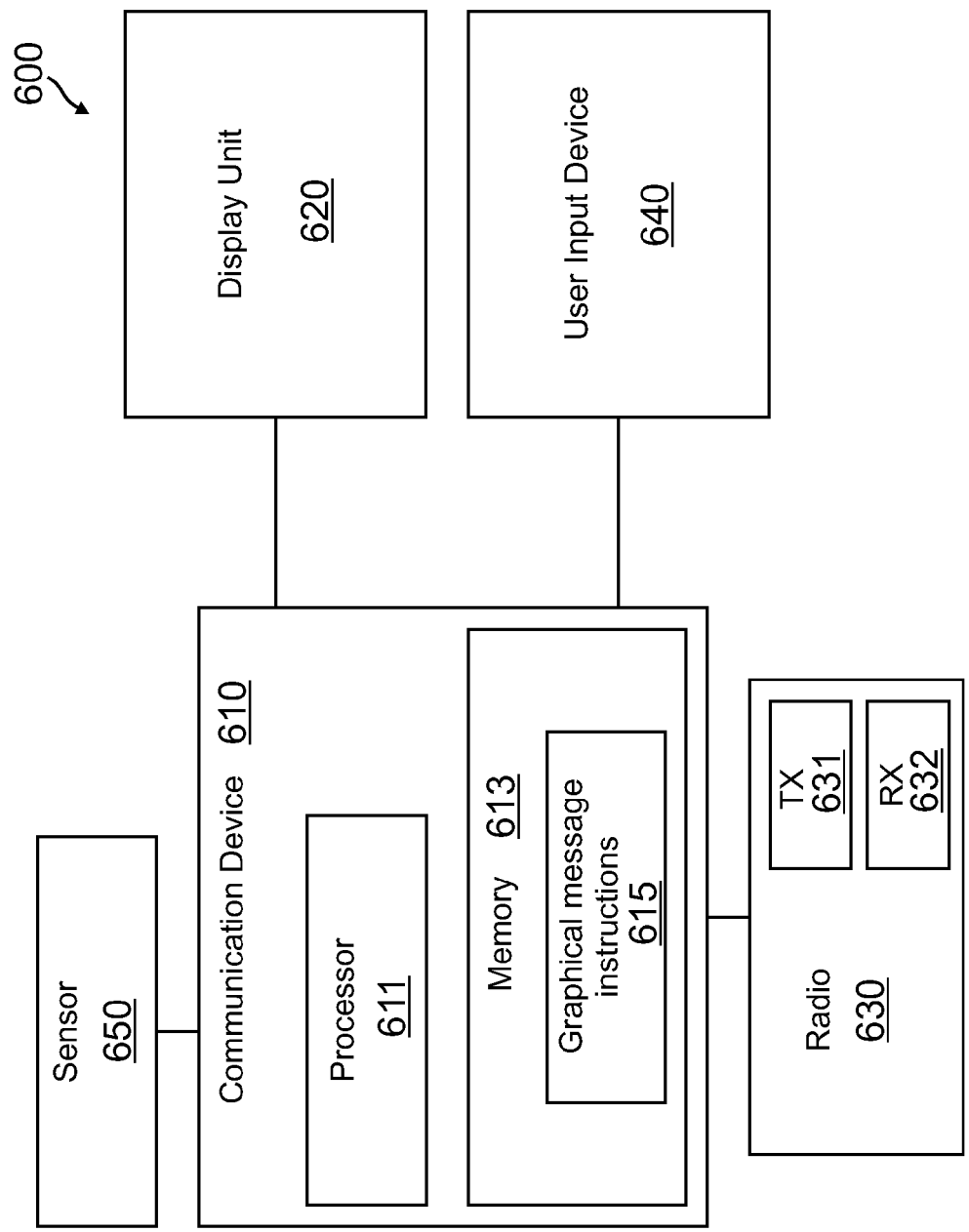
FIG. 6 illustrates a block diagram of one embodiment of a system for a graphical representation of in-flight messages.

FIG. 6 illustrates a block diagram of a system 600 for a graphical representation of in-flight messages. System 600 includes one or more communication devices 610, such as a datalink communication device. For the purposes of explanation, communication device 610 is depicted as a single device. It is to be understood that the communication device is not limited to just a single device, and may be a combination of more than one device. The communication device 610 can include, but is not limited to, a datalink control and display unit (DCDU) 611, an FMS or FMC 613, and/or a communication management unit (CMU) or CMF 614, and/or an electronic flight bag (EFB). The communication device 610 is configured to send and receive various in-flight messages directly or indirectly via a radio 630. The radio 630 includes a transmitter 631 configured to transmit signals and a receiver 632 configured to receive signals as known to one of skill in the art.

The communication device 610 is coupled to a display unit 620 on which a flight progress indicator and message icons can be displayed, as discussed above. In one embodiment, the display unit 620 can graphically represent a map GUI, and has overlay functionality that allows a user or pilot to graphically layer a flight path, as well as in-flight messages from the communication device 610. The display unit 620 can be implemented as any display unit which is capable of displaying graphical content. Suitable exemplary display units include, but are not limited to, a display associated with the FMS/FMC itself, a multifunction display (MFD), and/or a display associated with a CMU/CMF. Suitable technologies for implementing the display unit 620 include, but not limited to, a cathode ray tube (CRT) display, an active matrix liquid crystal display (LCD), a passive matrix LCD, or plasma display unit.

The communication device 610 is also coupled to a user interface device 640. The user interface device is configured to provide user selections and input to the communication device 610. The user input device 640 can be implemented as, but is not limited to, keyboards, touch screens, microphones, cursor control devices, line select buttons, glareshield buttons, etc. In some embodiments, the user input device 640 comprises more than one type of input device. In addition, the user input device 640 and the display unit 620 can be implemented as a single device, such as in the case of a touch screen device, or a Multipurpose Control Display Unit (MCDU). The communication device 610 is also directly or indirectly coupled to information from one or more sensors 650. Each sensor 650 configured to measure a characteristic of the flight. For example, the sensor 650 can be implemented in one embodiment as a global positioning system (GPS) receiver to measure the geographic location of the aircraft during flight. In another embodiment, the sensor 650 can be implemented as a timer to measure the time during flight or an altimeter to measure the altitude of the aircraft. It is to be understood that other sensors can be implemented in other embodiments and that more than one sensor can be used directly or indirectly.

The communication device 610 includes a processor 611 and a memory 613 having graphical message instructions 615 stored thereon. Processor 611 executes the graphical message instructions 615 in performing the functionality discussed herein to graphically represent messages. These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EE-PROM), flash memory, etc. Suitable processor-readable media may also include transmission media such as electrical, electromagnetic, or digital signals, conveyed via a communication medium such as a network and/or a wireless link.

In operation, when a message is received at the communication device 610 from the radio 630, the processor 611 sends control signals to the display unit 620 causing the display unit 620 to display a message icon representing the received message. In particular, the control signals cause the display unit 620 to display the message icon on a flight progress indicator based on when the message was received in relation to the characteristic measured by the sensor 650, as discussed above. Additionally, when a message is sent from the communication device 610, the processor 611 sends control signals to the display unit 620 to display a message icon representing the sent message on the flight progress indicator based on the characteristic measured by the sensor 650 when the message was sent, as discussed above.

In addition, as discussed above, a user can select a message icon using the user input device 640. For example, the user can select a message icon for review of a summary or for opening a response dialog, as discussed above. Based on the user input, the processor 611 provides control signals to the display unit to display the corresponding information. For example, in one embodiment, when a message is selected by hovering a pointer over a message icon, the processor 611 causes the display unit 620 to highlight related messages and/or provide a summary box with a summary of the message content. The summary of the message content is computed by the processor 611 based on the message content in the corresponding message. Hence, system 600 is configured to provide the graphical representation of messages as discussed above with respect to FIGS. 1-5.

Although specific embodiments have been illustrated and described herein, it will be appreciated by those of ordinary skill in the art that any arrangement, which can achieve the same purpose, may be substituted for the specific embodiments shown. Therefore, it is manifestly intended that this invention be limited only by the claims and the equivalents thereof.

What is claimed is:

1. A graphical in-flight message representation system comprising:
    a communication device configured to send and receive in-flight messages,
      wherein an in-flight message is a message communicated to or from the aircraft during a flight of an aircraft; and
    a display unit configured to display a graphical flight progress indicator and one or more message icons, each of the one or more message icons corresponding to a respective in-flight message;
    wherein the graphical flight progress indicator is a representation of a flight path representative of a characteristic of the flight wherein each of the one or more message icons is displayed along the graphical flight progress indicator in a position directly overlaid on top of the graphical flight progress indicator, at the time that the respective in-flight message was communicated to or from the aircraft, the position corresponding to when the respective in-flight message was communicated to or from the aircraft in relation to the characteristic of the flight; and
    wherein the display unit is configured to display a response dialog when one of the one or more message icons is selected, wherein the response dialog for the selected message icon displays content of the respective in-flight message and options to respond to the respective in-flight message associated with the selected message icon from within the response dialog.

2. The graphical in-flight message representation system of claim 1, wherein the display is further configured to modify a property of at least one of the one or message icons to represent meta-information associated with the respective in-flight message, wherein meta-information is information other than the content of the in-flight message.

3. The graphical in-flight message representation system of claim 2, wherein the meta-information includes at least one of message type, message meaning, response type, message status, message origin, message relationship, dialog type, message priority, response status, uplink indication, or downlink indication.

4. The graphical in-flight message representation system of claim 2, wherein the modified property of the message icon includes at least one of color, shape, size, text, shading, font, font size, border size, or border color.

5. The graphical in-flight message representation system of claim 1, wherein the graphical flight progress indicator and message icons are map layers on a graphical user interface of a map display.

6. The graphical in-flight message representation system of claim 1, wherein the characteristic of the flight of the aircraft includes at least one of altitude, geographic location, or time.

7. The graphical in-flight message representation system of claim 1, wherein the display unit is configured to display a selectable message filter, wherein the selectable message filter provides options from which a user selects messages to view in message icon form.

8. A method of graphically representing in-flight messages, the method comprising:
    receiving at least one in-flight message communicated to the aircraft during the flight of the aircraft;
    overlaying a message icon for each respective in-flight message over a flight progress indicator, in a position directly overlaid on top of the graphical flight progress indicator, at the time that the respective in-flight message was communicated to or from the aircraft, wherein the flight progress indicator is a representation of a flight path representative of a characteristic of the flight, and wherein the message icon for each respective in-flight message is positioned directly on top of the flight progress indicator, the position of the message icon corresponding to when and/or where the respective in-flight message was received or sent in relation to the characteristic of the flight;
    displaying meta-information associated with each respective in-flight message, wherein the meta-information is information about the respective in-flight message other than the content of the respective in-flight message itself, and displaying a response dialog when one of the message icons is selected, wherein the response dialog for the selected message icon displays content of the respective in-flight message and options to respond to the respective in-flight message associated with the selected message icon from within the response dialog.

9. The method of claim 8, wherein the meta-information associated with each respective in-flight message is represented as a property of the respective message icon.

10. The method of claim 9, wherein the meta-information associated with the in-flight message includes at least one of message type, message meaning, response type, message status, message origin, message relationship, dialog type, message priority, response status, uplink indication, or downlink indication; and wherein the property of the respective message icon includes at least one of color, shape, size, text, shading, font, font size, border size, or border color.

11. The method of claim 8, further comprising, opening a response dialog when a message icon is selected; and setting a status indicator indicative of whether a response was sent.

12. The method of claim 11, further comprising, opening the at least one in-flight message when indicated by user input via the response dialog or the message icon.

13. The method of claim 8, wherein the flight progress indicator represents at least one of altitude of the aircraft, geographic location of the aircraft, or time.

14. The method of claim 8, further comprising, filtering display of message icons according to options selected in a selectable message filter, wherein a selectable message filter provides a user with options from which a user selects messages to view in message icon form.

15. A program product comprising a processor-readable medium on which program instructions are embodied, wherein the program instructions are configured, when executed by at least one programmable processor, to cause the at least one programmable processor to:

output commands to a display unit to display a graphical flight progress indicator, wherein the flight progress indicator is a representation of a flight path representative of a characteristic of a flight of an aircraft;

analyze an in-flight message to determine when the in-flight message was communicated to or from the aircraft in relation to the characteristic of the flight of the aircraft;

output commands to the display unit to display a message icon indicative of the in-flight message, wherein the message icon is in a position directly overlaid on top of the graphical flight progress indicator, at the time that the respective in-flight message was communicated to or from the aircraft, on the flight progress indicator in a position corresponding to when the respective in-flight message was communicated to or from the aircraft in relation to the characteristic of the flight; and output commands to the display unit to display a response dialog when the message icon is selected, wherein the response dialog for the selected message icon displays content of the in-flight message and options to respond to the in-flight message associated with the selected message icon from within the response dialog.

16. The program product of claim 15, wherein the program instructions are further configured to cause the at least one programmable processor to:

output commands to the display unit to modify at least one property of the message icon to represent meta-information associated with the in-flight message, wherein meta-information is information other than the content of the in-flight message itself.

17. The program product of claim 16, wherein the meta-information associated with the in-flight message includes at least one of message type, message priority, message meaning, response type, message status, message origin, message relationship, dialog type, response status, uplink indication, or downlink indication; and wherein the modified property includes at least one of color, shape, size, text, shading, font, font size, border size, or border color.

18. The program product of claim 15, wherein the program instructions are further configured to cause the at least one programmable processor to output commands to the display unit to display a selectable message filter, wherein the selectable message filter provides options from which a user selects the type of communications or the type of in-flight messages to view in message icon form.

19. The graphical in-flight message representation system of claim 1, wherein the flight characteristic is measured by a sensor.

* * * * *